Patented Feb. 29, 1944

2,342,962

UNITED STATES PATENT OFFICE 2,342,962

PLANT EXTRACTS

Harry A. Noyes, Marlboro, Mass.

No Drawing. Application August 26, 1940,
Serial No. 354,254

11 Claims. (Cl. 99—205)

This invention relates to the making of more "natural" juices, extracts and concentrates from fruits, vegetables, leaves, herbs and the like.

The objectives of processes vary. Some processors attempt to produce products that taste "like the fresh" while others try and have less changes, than are customary, result from the heating, aeration, cooking, etc., that go with standard procedures. Where it has been customary to eat a product in its "natural" state, as for example an apple, it would be desirable to produce an apple juice that has all the "bouquet" of the fresh apples. To illustrate that progress is being made in producing more "natural" products for use "out of season," refrigeration has been applied with such consideration of the many changes that occur in the ripening of fruit that many persons do not readily distinguish between a fresh apple, recently picked ripe, and one that has been held in proper cold storage for several months.

When most commercial products that have been prepared from the "fresh" are tasted, it is evident that they do not have the full "natural" taste and flavor characteristics of the products that they were produced from. Studies made of the tastes coming from the skin, pulp, seeds, juice, etc., lead to the conclusion that, in general, commercial products are not only changed but also deficient in constituents of the "natural." I hold that too much emphasis has been given to searches for specific compounds that are held to be the particular flavor of the "natural" product. It is my belief, based on experience, investigations and observations, that while each "natural" product may be dominated by one or a small group of chemical compounds, those compounds when apart from the naturally produced product do not constitute the full "natural" flavor.

I have discovered methods for producing more "natural" products in the form of juices, extracts and concentrates of, for example, tomatoes, apples, cherries, strawberries, plums, alfalfa, senna, etc., than has hithertofore been customary or possible.

It is the main objective of this invention to produce more nearly "natural" juices, extracts and concentrates from products of Nature.

Another objective is to obtain extracts from fruits, vegetables and other products of Nature that are not only more complete in natural constituents but in the blending of the same together.

Other objectives will be recognized as the invention is explained and illustrated.

I am not pointing out technical disagreements in any phases of changes or phenomena that are popularly designated as the results of enzymatic activities, nor would I make the statement that all enzymatic activities accompanying processing are undesirable. It appears evident, however, that some undesired phenomena, ascribed to enzymatic origin, may have other explanations.

In the commercial production of a fruit or vegetable juice it is desirable to get a good yield from a given weight of raw products. It has been found, however, that extraction beyond a certain point yields characteristics that are not desired and, moreover, practical considerations, as amount of energy required per extra gallon of juice, strength of filter cloths necessary, etc., make it inadvisable to extract much beyond where the residue contains fifty percent moisture. In "practice," satisfactory yields are obtained more easily and at less cost if the raw materials are heated previous to extracting the juice. Heating usually precedes or accompanies maceration and, in recent years, available macerating machinery has been so efficient that less heat than formerly is being currently used. It is not only recognized that heating may produce chemical changes, cooking, browning, etc., if carried too far as to either elevation of temperature or time of treatment, but that it may cause extraction of material that should remain in the residues.

It is my discovery that "natural" flavors are retained by new methods of handling the raw materials that keep characteristics (substances in relation one to the other) that it has been customary (1) to volatilize, (2) to have enter into combination with other substances to the detriment of the product and/or (3) to be submerged by other tastes and flavors. A point seemingly quite generally ignored, in its applications, is that distinctive characteristics may be lacking in temperate zone products gathered in extremely hot weather. The differences between semi-tropical products, as to the characteristic that is termed "foxiness," when compared to products grown in cooler climates are illustrative.

A commercial process for making tomato juice could go about as follows: Baskets, boxes or hampers of ripe tomatoes would be dumped into flowing cold water in the receiving end of a mechanical washer. The washer would loosen up clinging dirt so that it would separate itself from the tomatoes as they were turned over and over and conveyed along in the washer. As a conveyor elevated the tomatoes from the washer they would be further washed and then "looked over" by workers who pick out imperfect and unripe fruit. Next, the tomatoes would pass on to the "scalder" where they would come in contact, for a short time, either with both hot water and flowing steam or with hot water alone. They would pass from the "scalder" onto moving belts where they would be graded and inspected again in order that no undesirable or foreign material would get into the extractors. The extractors would macerate the tomatoes, separate out the skins, seeds, etc., and deliver the juice, carrying finely divided pulp, to holding tanks. As rapidly as possible the juice would be moved along through the steps of deaerating, homogenizing, heating, filling into containers, pasteurizing and cooling. In many plants the cooling is followed by labeling, packing and making the product ready for shipment. If a concentrated juice was made the step of concentration would usually precede the homogenization.

Both unconcentrated and concentrated tomato juices made by procedures similar to the above are different from the juice just as it is pressed or sucked from raw tomatoes. If differences, in flavor in previous customary processes were, to a major extent, due to the heating taking place in the heating and evaporating steps, after the juice was extracted, they might be taken care of by simple processing equipment changes. Continuous automatic heaters run by vacuum steam could be practical for heating the unconcentrated juice. Special vacuum pans with special condensers for recovering substances going off in the concentration steps, under the general term of "esters," could be used. It is my observation, however, that a number of substances that may be placed under the term "esters" are lost before the juice is extracted. It is my discovery that if these substances were not driven off by elevated temperatures in present methods of preparation for extraction, commercial juices would taste more nearly like fresh tomatoes.

As an illustration of my invention stated in comparison to the above general description of standard procedures, the tomatoes are taken through the washing, sorting, etc., steps without raising their temperatures by added heat. The "scalding" step is omitted. Next the tomatoes are macerated (without the juice being separated as a separate portion) through employing a suitable machine. One of the "Hammermill" type has been found to work well. The macerated mass, with as little contact with the air as feasible and as quickly as possible, is drawn directly into a vacuum pan, which has an agitating means sufficient to keep the mass moving freely. The vapor condenser is so constructed that the vapors, distilled under high vacuum, can be readily condensed and collected. On the vacuum line, even beyond the vapor condenser, is a section so constructed that it is maintained at near the freezing point of water where even more of the so-called "esters" can be collected.

The vacuum pan is filled to the working level with the mass of macerated tomatoes (juice, pulp, etc., all together), the vapor condensers are cooled and a high vacuum drawn on the vacuum pan with the agitator in motion, whereby the more highly volatile components of the mass are vaporized and condensed. Next, steam is introduced into the heating jacket, while maintaining agitation of the contents and high vacuum, and from one tenth to one eighth of the volume of liquid in the mass in the pan is evaporated and condensed into the receivers prepared for it. During operation the vacuum is kept above 26 inches of mercury. To get operating efficiency, the control of the steam used for heating the vacuum pan is important and in operations that require vacuum steam to prevent overheating of any part of the liquid, temperatures of the vacuum steam employed for heating are held in the region of not over 160 degrees Fahrenheit. When the "esters" have distilled over, the heating is stopped, the vacuum broken and the material remaining in the pan put through machines or presses to separate the juice from the solid portions. The resulting juice which carries finely divided pulp is then homogenized, quickly heated to about 140 degrees Fahrenheit and "filled" into containers, to which the proper amount of the "ester" fraction has already been added cool. The containers are sealed before any loss of "esters" takes place due to the higher temperature of the juice. They are then pasteurized with minimum heat, cooled and from this point on, handled as first class products of their kind.

After closing, the containers may be turned over, rolled etc. to aid in the reincorporation of the "esters" with the juice in order to get the fully blended and more natural flavor. The amount of pasteurization necessary depends on a number of factors. Adjustments are made on the basis of the operator's experience with and knowledge of the particular product.

I have designated the solutions condensed from the high vacuum distillations of the mass as "esters" (the term is used in a general sense). These solutions may have neither the odors of nor the tastes associated with the products from which they have been separated: They are mixtures, containing small quantities of substances other than water, when figured on a percentage basis, and no attempt is made here to designate just what they do contain. Part of their functions and properties, when they are reincorporated with the juices or with other substances can be to promote miscibilities and to aid in the "bouquet" of the product.

I have found that "esters" (so termed) when in water solution, as when first condensed or after concentration, are new products whose applications and uses are not fully known. Their treatment for the purposes of obtaining specific substances therefrom and also their fractional distillation offer possibilities for new uses. It is common knowledge that Nature protects plants and animals from many infections. No attempt is here made to include or to minimize specific organisms that have powers of overcoming resistances that are normal to either specific plants or animals. Reference, however, is made to the fact that plants and animals keep on growing and remain healthy in the presence of microorganisms which would live upon and decompose them if it were not for natural protecting abilities of the plants and the animals themselves. I have held, for some time, that the main protective agency was the carbon dioxide that is being changed by life processes, but I now associate the substances that I have termed "esters" in this invention.

If a concentrated tomato juice is made, the separated juice, when its vacuum concentration is started, may yield a little more of the "ester" fraction. The concentration of the juice is carried to such a stage that when put with the "ester" portion, in the stage of concentration that that has been subjected to, the resulting mixture will be the strength desired. In concentrating natural products of the types involved here, it is to be noted that jellations may occur at concentrations less than those usual in non-vacuum concentrations. There are known concentrations of soluble solids which keep products from fermenting but these concentrations cannot be reached, as a regular procedure, in the vacuum concentrations used to carry out my process. In concentrating the "esters" the procedure is the same as for the juice in general terms only, for the volatility of the substances in the "esters" and the changes that may occur in them require high vacuum, low temperatures and efficient condensing. Further, the point in the distillation at which they all have been driven over has to be watched for. In "filling" the concentrated juice into containers the usual procedure is to add the cool "esters" in proper amount to the individual container and then add the concentrated juice in a temperature range of 120 to 140 degrees Fahrenheit, approximately. Necessary pasteurization and then cooling follow as rapidly as possible.

As an example: 10 tons or 20,000 pounds of tomatoes. These yield 2,000 pounds of "ester" condensate and 14,000 pounds of juice. The product is to be marketed concentrated 4 parts to 1, by weight, which can be accomplished in ways such as A or B.

A. 14,000 pounds of juice are vacuum concentrated to 3,500 pounds and the 2,000 pounds of the "ester" fraction are concentrated to 500 pounds. In putting up the product in final form 7 pounds of the concentrated juice are used with 1 pound of the "ester" concentrate.

B. The 2,000 pounds of the "ester" fraction are only concentrated to 1,000 pounds. A 4 to 1 concentration requires 4,000 pounds of juice and "esters" together, therefore the juice is concentrated to 3,000 pounds and in making the finished 4 to 1 product, 3 pounds of the concentrated juice are put with 1 pound of the "ester" concentrate.

The "ester" fraction in the above procedures carries not only "esters" which are present in the regularly handled juice and the "esters" which are customarily lost in the "scalding" operation, but the "esters" from the portions that are removed by the presses or the extractors in the usual or the customary procedures. My product is therefore distinctive.

In the handling of different fruits and vegetables variations are made, by those skilled in the arts of food processing, to go with the properties of the particular product. Making apple juice and a concentrated apple juice by my process would be, for example, a variation from handling tomatoes and they follow: Usually apples are received at processing plants carrying a certain amount of soil and spray residues. The first steps are washing, sorting and removing the spray residues by special washing machines and treatments, if such are found desirable. My process does this with water and all other substances used at room temperature or lower. The clean apples are then further inspected and the undesired removed as the apples are conveyed along on their way to the "grinders." They are then crushed and the macerated mass of liquids and solids passed quickly into a vacuum pan having the equipment and connections mentioned in treating the tomatoes. The "esters" are separated by the same procedures as used with the tomatoes. The de-"esterized" mass then goes to the presses (or other extractors) where the juice is separated from the pomace. The juice is subjected to filtering etc. as the character of the particular liquid requires. From this point on, the heating, "filling into containers" carrying the proper amounts of the cool "ester" portion, sealing, pasteurization, cooling, etc., parallel the tomato juice operation. This holds for the concentrated product also.

Another application of my invention is to take pitted cherries as they come from the pitters, macerate them, separate off the "esters," add sugar (properly proportioned as to sucrose and invert), concentrate and then add the concentrated product to the cool "ester" portions, distilled or concentrated, that have been placed in the containers.

Strawberry preserves and jam with added "esters" are but two of many products that would occur to those "skilled in the arts" of food processing. With raw products having seeds, cores, etc., that could give more added tastes than desired, such parts can often be easily removed or, in practical factory processing, the time of treatment shortened with little loss of desired constituents. In certain cases the maceration may only be partial or postponed until after the "ester" portion has been removed. In the latter case an "ester" fraction can be also obtained in the concentrating step, if employed.

Certain substances of medicinal value are desired in more concentrated forms and apart from the raw products that produce them. Leaching, washing and standard percolation are means of extracting these. After the extracts are made, they are concentrated and my process can be used either to remove the "esters" from the raw products or in the first steps of the concentration of the juices. Reincorporation of the "esters" after concentration give characteristics that are desirable and of which I am not explaining the chemistry concerned here. The "esters" can have uses with other products than those from which they were obtained. Substances such as sugars, flavorings etc., may be added in one or another stage of the processing as found desirable.

I have related my discoveries to the usual art as practised and illustrated how they can be used. The above examples should not be taken as limiting the scope of the following claims.

I claim:

1. The process of obtaining liquid products from plants, fruits and vegetables, which comprises distilling raw plant material, that has not been previously raised in temperature above room temperatures, under high vacuum of the order of at least 26 inches of mercury by the controlled addition of heat sufficient to cause vaporization of the ester substances and a minor fraction of the water content of the plant material in the vacuum, collecting the vapors so produced, and condensing such vapors at temperatures ranging downward to approximately the freezing point of water.

2. The process of obtaining derivative products from plants, fruits and vegetables, comprising subjecting raw plant material which has never been subjected to heat over room temperatures after gathering, to high vacuum in the order of at least 26 inches of mercury at room temperature, whereby the most volatile ingredients of the material are vaporized, then applying sufficient heat to the material to raise its temperature to that of the boiling point of water under said vacuum, and vaporize the ester content and a minor fraction of the water content of the material, and collecting and condensing the vapors at temperatures down to a point near the freezing point of water.

3. The process of obtaining derivative products from plants, fruits and vegetables, comprising subjecting raw plant material which has never been subjected to heat above room temperatures after gathering, to high vacuum in the order of at least 26 inches of mercury at room temperature, whereby the most volatile ingredients of the material are vaporized, then heating the material to approximately the boiling temperature of water under said vacuum and continuing heat application for a length of time sufficient to vaporize the ester content and a minor fraction of the water content of the material, agitating the material throughout the vaporizing procedure, and collecting and condensing the vapors at temperatures down to a point near the freezing point of water.

4. The process of obtaining derivative products from plants, fruits and vegetables containing the characteristic taste and flavor of the plant, fruit or vegetable from which such product is derived, comprising subjecting raw plant material which has never been heated above room temperatures after gathering, to high vacuum of at least 26 inches of mercury, heating the material sufficiently to vaporize under said vacuum the ester content and a minor fraction of the water content of the material, collecting and condensing the vapors at temperatures near the freezing point of water, removing the unvaporized fraction of the material from the vacuum, separating liquid from the solid portions of the material, heating such separated liquid to a temperature not above that sufficient for pasteurization, placing the condensate of the distilling step, while still cool, in a container, then placing the so heated liquid in the same container, immediately sealing the container, and then processing to obviate deterioration.

5. The process of obtaining plant products having the tastes and flavors characteristic of the respective plant materials from which they are respectively obtained, comprising cleaning and macerating the raw plant material without raising its temperature above room temperature, subjecting the macerated mass which consists of both liquids and solids to a vacuum in the order of more than 26 inches of mercury without addition of heat, collecting at the commencement of the vacuum subjection, and thereafter, the volatile substances thereby distilled from the mass and condensing such substances at a temperature near the freezing point of water, then after partial distillation at room temperature and while maintaining substantially the same degree of vacuum and agitating the mass, applying controlled heat additions to the mass sufficient to vaporize more of the volatile constituents and a fraction amounting to from one-tenth to one-eighth of the liquid content of the mass, collecting and condensing the vapors so produced at temperatures ranging downward to approximately the freezing point of water, then releasing the unevaporated mass of material from the vacuum, separating the juice from the solid material in the mass, and finally incorporating the condensed distillate with the separated juice in such manner as to avoid any appreciable loss of volatile matter in the condensate.

6. The process of obtaining plant products having the tastes and flavors characteristic of the respective plant materials from which they are respectively obtained, comprising cleaning and macerating the raw plant material without raising its temperature above room temperature, subjecting the macerated mass which consists of both liquids and solids to a vacuum in the order of more than 26 inches of mercury without the addition of heat, collecting the volatile substances thereby distilled from the mass and condensing such substances at a temperature near the freezing point of water, then while maintaining substantially the same degree of vacuum and agitating the mass, applying controlled heat additions to the mass sufficient to vaporize the volatile constituents and a fraction amounting to from one-tenth to one-eighth of the water content of the mass, collecting and condensing the vapors so produced at temperatures ranging downward to approximately the freezing point of water, then releasing the unevaporated mass of material from the vacuum, separating the juice from the solid material in the mass, then concentrating the distillate previously obtained by redistillation under vacuum of at least 26 inches of mercury with controlled heating sufficient to vaporize the lower boiling fraction of the liquid and efficient condensation of such fraction at temperatures in the neighborhood of the freezing point of water, separately concentrating the juice by boiling under vacuum of at least 26 inches of mercury, and combining the concentrated distillate with the concentrated juice.

7. The process of making a concentrated plant extract from the raw plant product, which comprises cleaning the plant product and preparing a mixed mass of the liquid and solid portions thereof without raising the temperature of the raw material above room temperatures, subjecting such mass to a vacuum of at least 26 inches of mercury, applying controlled heat to the mass at temperatures and for a time sufficient only to vaporize the lower boiling constituents and a fraction of not more than approximately one-eighth of the water content of the mass, capturing the vapors given off from the mass and condensing them under temperatures ranging downward to approximately the freezing point of water, separating the liquid portion from the solid portion of the unevaporated material, concentrating said liquid portion by boiling in a vacuum of at least 26 inches of mercury, collecting and condensing the vapors produced by such boiling, separately concentrating the distillate of the first distilling operation under vacuum of at least 26 inches of mercury at a temperature and for a length of time sufficient to vaporize only a minor fraction of that distillate, collecting and condensing at a temperature in the neighborhood of the freezing point of water the vapors thereby evolved, and combining the condensate of the last-named distillation with the separately concentrated liquid portion.

8. The process of making a fruit product, which comprises cleaning and macerating raw fruit material without raising the temperature thereof to above room temperatures, distilling the readily volatile constituents of the material in a vacuum of at least 26 inches of mercury by applying to the material heat sufficient only to vaporize such volatile constituents and a fraction amounting to not more than approximately one-eighth of the water content of the material, capturing the vapors so produced and condensing them under temperatures ranging downward to approximately the freezing point of water, removing the condensate and retaining it for subsequent use, continuing the high vacuum distillation of the residue until the same has attained a predetermined degree of soluble solids concentration, then removing the concentrated material from the influence of the vacuum, and mechanically processing the concentrated material and combining therewith distillate containing said volatile constituents.

9. The process of making a fruit jam, which comprises cleaning and making a pulp of raw fruit and adding to such pulp soluble solid matter in solution, all without raising the fruit pulp at any time to a temperature above room temperatures, subjecting the mixture so prepared to a vacuum of at least 26 inches of mercury, and, while under such vacuum, applying heat sufficient only to vaporize the more readily volatile ingredients and a minor fraction amounting to not more than one-eighth of the water content of the fruit mass, capturing and condensing at temperatures down to approximately the freezing point of water the vapors so liberated from the mass, removing and preserving the condensate of such vapors for subsequent use, continuing the evaporation under vacuum of the fruit material until the content of soluble solids in such mass has attained a predetermined proportion, removing the concentrated mass from the influence of the vacuum, and combining the previously collected distillate with the fruit concentrate.

10. In a procedure of making useful products from raw plants, fruits and vegetables, the step of separating the most highly volatile components of a raw plant, fruit or vegetable, which consists in preparing a mass of the raw plant, fruit or vegetable containing liquid and solid portions, without at any time heating the mass above room temperatures, subjecting such mass to a high vacuum of at least 26 inches of mercury, at room temperature, and condensing at a temperature approximating the freezing point of water the vapors then issuing from the mass.

11. In a procedure of making useful products from raw plants, fruits and vegetables, the steps of separating the most highly volatile components of a raw plant, fruit or vegetable, which consists in preparing a mass of the raw plant, fruit or vegetable containing liquid and solid portions without at any time heating the mass above room temperatures, subjecting such mass to a high vacuum of at least 26 inches of mercury, at room temperature, condensing at a temperature approximating the freezing point of water the vapors then issuing from the mass, and continuing distillation of liquid portions of the mass at substantially the same vacuum while heating to temperatures within a high limit of approximately 125° F.

HARRY A. NOYES.